US012604132B2

(12) United States Patent
Kim

(10) Patent No.: US 12,604,132 B2
(45) Date of Patent: Apr. 14, 2026

(54) HEADSET HAVING VARIABLE BAND STRUCTURE

(71) Applicant: SAMSUNG ELECTRONICS CO., LTD., Suwon-si (KR)

(72) Inventor: Jinwook Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 287 days.

(21) Appl. No.: 18/231,492

(22) Filed: Aug. 8, 2023

(65) Prior Publication Data

US 2023/0388699 A1 Nov. 30, 2023

Related U.S. Application Data

(63) Continuation of application No. PCT/KR2022/001935, filed on Feb. 8, 2022.

(30) Foreign Application Priority Data

Feb. 8, 2021 (KR) ........................ 10-2021-0017622

(51) Int. Cl.
*H04R 1/10* (2006.01)

(52) U.S. Cl.
CPC ......... *H04R 1/1066* (2013.01); *H04R 1/1008* (2013.01); *H04R 1/105* (2013.01)

(58) Field of Classification Search
CPC .... H04R 1/105; H04R 1/1008; H04R 1/1066; H04R 2201/10

(Continued)

(56) References Cited

U.S. PATENT DOCUMENTS 3,719,954 A * 3/1973 Beguin .................... A61F 11/14 2/209
4,027,113 A * 5/1977 Matsumoto ......... F16C 11/0661 381/370

(Continued)

FOREIGN PATENT DOCUMENTS

CN 107801115 A 3/2018
CN 207612387 U 7/2018

(Continued)

OTHER PUBLICATIONS

International Search Report for International Application No. PCT/KR2022/001935; International Filing Date Feb. 8, 2022; International Search Report Mail Date May 27, 2022; 52 Pages.

(Continued)

*Primary Examiner* — Katherine A Faley
(74) *Attorney, Agent, or Firm* — CANTOR COLBURN LLP

(57) ABSTRACT

One embodiment according to the present disclosure comprises: an ear unit for accommodating a speaker therein; a head band; a first connection member arranged inside the ear unit; and a second connection member coupled to the head band, wherein: the second connection member comprises a second support member connected to the first connection member so that the head band can pivot, and an inclined surface formed to encompass the second support member and arranged to form an inclined angle with a surface of the first connection member facing same; the top of the inclined surface is formed at the front of a headset; and the second connection member can include a protrusion arranged on one surface of the inclined surface and arranged to rotate along one surface of the first connection member in accordance with the pivoting of the head band.

20 Claims, 15 Drawing Sheets

(58) Field of Classification Search
USPC .................................................. 381/374, 379
See application file for complete search history.

(56) References Cited

U.S. PATENT DOCUMENTS

| | | | | |
|---|---|---|---|---|
| 6,542,615 | B1 | 4/2003 | Ito | |
| 9,113,253 | B2 | 8/2015 | Yoshida | |
| 9,838,776 | B2 | 12/2017 | Broadley et al. | |
| 10,136,210 | B2 | 11/2018 | Blair | |
| 10,277,974 | B2 | 4/2019 | Shiomi et al. | |
| 10,681,461 | B2 | 6/2020 | Fukushima et al. | |
| 10,687,133 | B2 | 6/2020 | Ozawa | |
| 2002/0031238 | A1 | 3/2002 | Murozaki et al. | |
| 2002/0110249 | A1 | 8/2002 | Jeon et al. | |
| 2004/0213427 | A1* | 10/2004 | Yoon | H04R 1/1058 381/370 |
| 2012/0051576 | A1* | 3/2012 | Shiomi | H04R 1/1008 381/374 |
| 2013/0343591 | A1 | 12/2013 | Brunner et al. | |
| 2020/0280789 | A1 | 9/2020 | Schrader et al. | |

FOREIGN PATENT DOCUMENTS

| | | | |
|---|---|---|---|
| JP | 2007208882 | A | 8/2007 |
| KR | 20020018024 | A | 3/2002 |
| KR | 20020066129 | A | 8/2002 |
| KR | 200364525 | Y1 | 10/2004 |
| KR | 20110011673 | A | 2/2011 |
| KR | 101120774 | B1 | 2/2012 |
| KR | 20170125342 | A | 11/2017 |
| KR | 101881069 | B1 | 8/2018 |
| WO | 2018195592 | A1 | 11/2018 |

OTHER PUBLICATIONS

Korean Notice of Patent Grant; Application No. 10-2021-0017622; mailed Jun. 20, 2025; 3 pages, with English Translation.

* cited by examiner

HEADSET HAVING VARIABLE BAND STRUCTURE

CROSS-REFERENCE TO RELATED APPLICATION(S)

This application is a continuation application, claiming priority under § 365(c), of International Application No. PCT/KR2022/001935 filed on Feb. 8, 2022, which is based on and claims the benefit of Korean patent application number 10-2021-0017622 filed on Feb. 8, 2021, in the Korean Intellectual Property Office, the disclosures of which are incorporated by reference herein in their entireties.

TECHNICAL FIELD

The disclosure relates to a headset including a deformable band structure and, more particularly, to a connection member configured to improve shielding performance in a headset including a deformable band structure and a device including the connection member.

BACKGROUND ART

A headset may be provided to output sound content. Depending on how a headset is worn, the headset may be provided in a headband type in which the band of the headset is worn in the form of a headband and a neckband type in which the band of the headset is worn behind the neck.

DISCLOSURE OF INVENTION

Technical Problem

A recently released headband-type headset has a headband shape, which may affect a user's hair style and cause discomfort as usage time increases.

A recently released neckband-type headset has problems in that ear units do not have a sufficient space due to an unstable structural characteristic and the performance of the headset may not be improved.

Furthermore, when the wearing method is changed from the headband type to the neckband type, there is a problem in that the surfaces of the ear units are partially detached from the user's body, impairing the shielding performance of the headset.

Various embodiments disclosed herein include a method and device that enable a headset to be transformed from a headband type to a neckband type or vice versa and that, in a headset including a connection member and a holder, allow ear units to be in close contact with and to be fixed to a user's body.

Solution to Problem

A headset of an embodiment may include an ear unit configured to accommodate a speaker therein, a headband, a first connection member disposed inside the ear unit, and a second connection member coupled to the headband. The second connection member may include a second support member connected to the first connection member such that the headband is pivotable, and an inclined surface provided to surround the second support member and disposed to form an inclined angle with one surface of the first connection member facing the inclined surface. An upper portion of the inclined surface may be disposed on the front side of the headset with reference to the one surface of the first connection member, and the second connection member may include a protrusion disposed on the one surface of the inclined surface and disposed to rotate along the one surface of the first connection member as the headband pivots.

A headset of an embodiment may include an ear unit configured to accommodate a speaker therein, a headband, a first connection member disposed inside the ear unit, and a second connection member coupled to the headband. The second connection member may include a second support member connected to the first connection member such that the headband is pivotable, and an inclined surface provided to surround the second support member and disposed to form an inclined angle with one surface of the first connection member facing the inclined surface. An upper portion of the inclined surface may be disposed on the front side of the headset with reference to the one surface of the first connection member, and the second connection member may include a protrusion disposed on the one surface of the inclined surface and disposed to rotate along the one surface of the first connection member as the headband pivots.

Advantageous Effects of Invention

Based on the above discussion, according to an embodiment of the disclosure, it is possible to provide a headset that is transformable to be interchangeably worn in a headband type and a neckband type by using a structure that interconnects an ear unit and a headband.

Furthermore, according to an embodiment of the disclosure, a pressure may be generated in an ear unit by using a connection member. Accordingly, it is possible to provide a headset capable of improving the shielding performance thereof by bringing a surface of the ear unit into close contact with a user's body when the wearing method of the headset is changed.

Furthermore, according to an embodiment of the disclosure, it is possible to provide a headset capable of fixing an ear unit thereof to a user's body by using the structure of a holder included inside the ear unit when the wearing method is changed.

Various other effects identified directly or indirectly through this document may be provided.

BEST MODE FOR CARRYING OUT THE INVENTION

Hereinafter, various embodiments of the disclosure will be described with reference to the accompanying drawings. However, it is to be understood that the description is not intended to limit the disclosure to specific embodiments and includes various modifications, equivalents, and/or alternatives of the embodiments of the disclosure.

Figure 1:
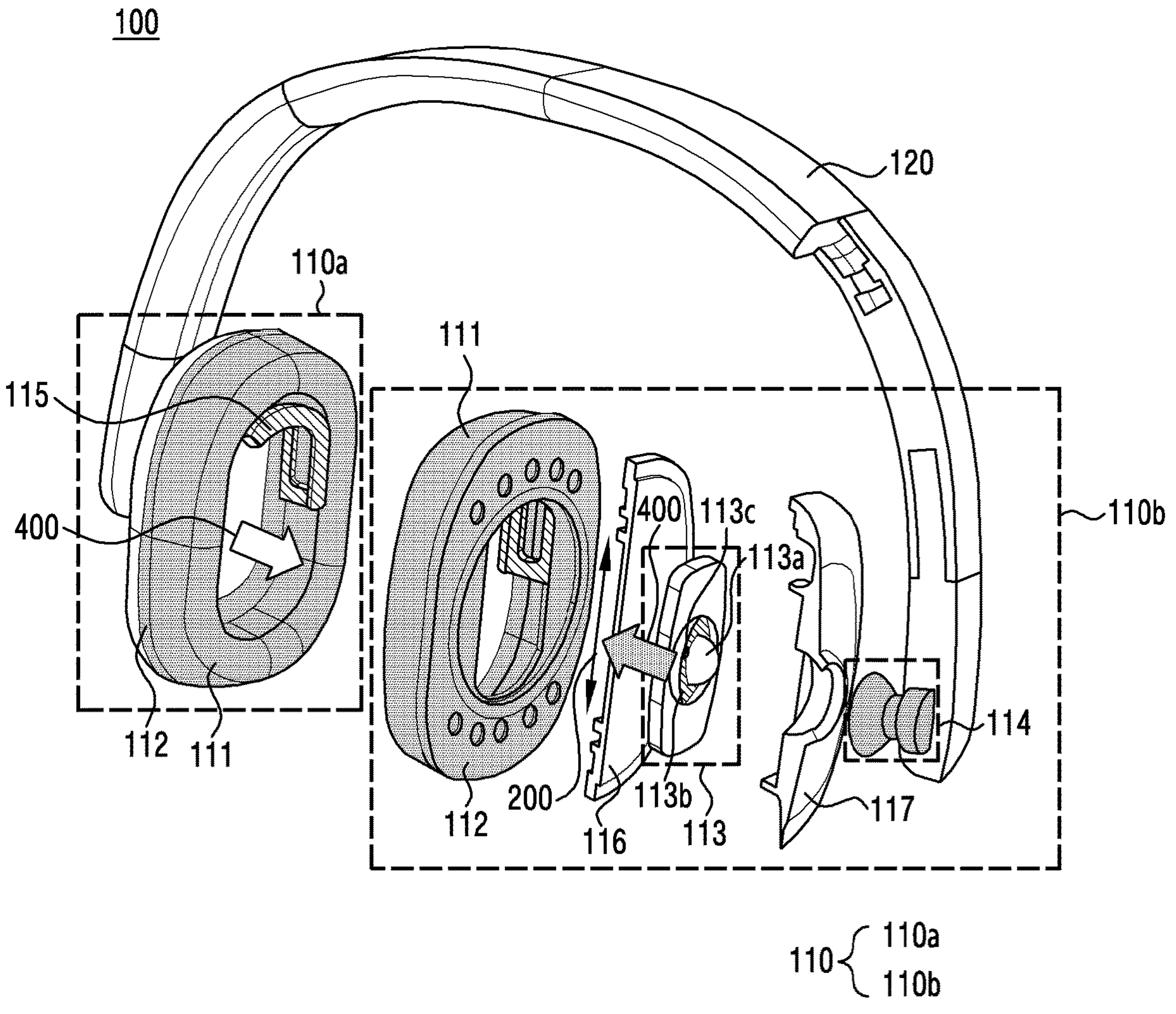
FIG. 1 is a perspective view illustrating a disassembled headset according to an embodiment.

FIG. 1 is an exploded perspective view of a headset 100 according to various embodiments.

Referring to FIG. 1, a headset 100 is a wearable electronic device worn on a user's ears and may include ear units 110 and a headband 120. The ear units 110 may include a first ear unit 110*a* and a second ear unit 110*b*. However, the configuration of the headset 100 is not limited thereto. According to various embodiments, at least one of the above-described components may be omitted from the headset 100, and one other or more other components may be further included in the headset 100. For example, the headset 100 may include a headset 100 in which a microphone is installed.

The ear units 110 may each include a speaker accommodated therein, an ear pad 111, an ear pad coupling member 112, a first connection member 113, a second connection member 114, and a coupling member 116 configured to be coupled to one surface of the first connection member 113, and an ear unit cover 117. The coupling member 116 may be included in an earphone body including the speaker. Herein, a component including a sound module including the speaker and at least one component physically coupled to the sound module may be referred to as an earphone body. However, the configuration of the ear units 110 are not limited thereto. According to various embodiments, at least one of the above-described components may be omitted from the ear units 110, and one or more other components may be further included in the ear units 110.

The ear pad 111 may include a structure that is capable of coming into contact with a user's body. According to an embodiment, the ear pad 111 may include a space capable of accommodating a user's ear. The ear pad 111 may have an opening provide in the sound output direction 400 to be capable of accommodating an ear. According to an embodiment, the ear pad 111 may be coupled to the ear pad coupling member 112. The ear pad 111 may be coupled to the ear pad coupling member 112 via an adhesive member. For example, the ear pad 111 may be coupled to the ear pad coupling member 112 by using at least one of adhesive tape or bond. However, the ear pad is not limited thereto. For example, the ear pad 111 may be integrally fabricated with the ear pad coupling member 112.

According to an embodiment, the ear pad coupling member 112 may be disposed between the ear pad 111 and the coupling member 116. The ear pad coupling member 112 may support the ear pad 111 and the coupling member 116. According to an embodiment, the ear pad coupling member 112 may include an opening in the sound output direction 400. One surface of the ear pad coupling member 112 surrounding the opening may face the coupling member 116. According to an embodiment, one surface of the ear pad coupling member 112 surrounding the opening may be detachable from the coupling member 116. According to an embodiment, the one surface of the ear pad coupling member 112 may include at least one recess. One surface of the coupling member 116 facing the one surface of the ear pad coupling member 112 may include at least one protrusion that is capable of being accommodated in the recess of the one surface of the ear pad coupling member 112. According to another embodiment, the ear pad coupling member 112 and the coupling member 116 may include magnets to be attachable and detachable with respect to each other.

Both ends of the headband 120 may be coupled to respective ear units 110. According to an embodiment, the headband 120 may include a structure configured to surround a user's head. For example, the headband 120 may have the shape of a headband. However, the headband is not limited to this structure. According to various embodiments, the headband 120 may include a structure that allows the headband 120 to be mounted on the head when the headband 120 is located in the longitudinal direction 200 of the ear pad 111. According to various embodiments, the headband 120 may include a structure that is curved in a shape corresponding to a user's head when the headband 120 is located in the longitudinal direction 200 of the ear pad 111.

According to an embodiment, the ear units 110 may be connected to the headband 120. The first ear unit 110*a* may be connected to one end of the headband 120. The second ear unit 110*b* may be connected to the other end of the headband 120. Each of the ear units 110 may include a structure allowing the connected headband 120 to pivot.

According to an embodiment, the ear units 110 may each include a first connection member 113 that allows the connected headband 120 to pivot. The headband 120 may include a second connection member 114 that may be connected to the first connection member 113. The first connection member 113 and the second connection member 114 may be connected through pivot coupling. However, the headband is not limited to this structure. According to another embodiment, the first connection member 113 and the second connection member 114 may be connected in a ball-and-socket type.

According to an embodiment, the headband 120 may be coupled to the second connection member 114 so as to be pivotable by the connection between the first connection member 113 and the second connection member 114. In an embodiment, there can be a second connection member 114 coupled to each of the opposite ends of the headband 120.

The ear unit cover 117 may protect electronic components seated in the corresponding ear unit 110 from the outside. The ear unit cover 117 may have a structure that prevents the second connection member 114 coupled with the headband 120 from being separated from the ear unit 110. For example, the ear unit cover 117 may include an opening through which the second connection member 114 may pass only in the sound output direction 400.

Hereinafter, various embodiments will be described with reference to the headset 100 illustrated in FIG. 1 for convenience of description.

Figure 2:
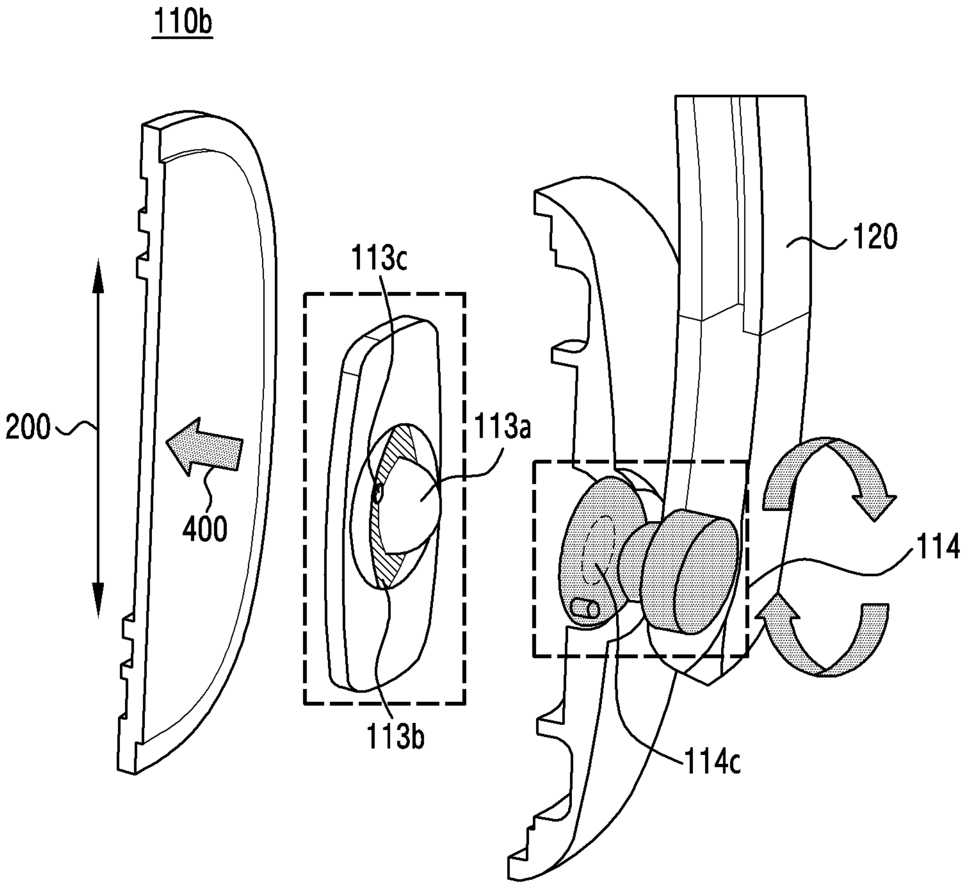
FIG. 2 is a perspective view illustrating a portion of a disassembled ear unit according to an embodiment when used as a headband type (first state).

FIG. 2 illustrates a configuration of a portion of an ear unit 110*b* when the headset 100 according to various embodiments is used as a headband type (first state).

Referring to FIG. 2, the first connection member 113 may include a structure pivotably connected to the second connection member 114. According to an embodiment, the first connection member 113 may include a first support member 113*a*, and the second connection member 114 may include a second support member 114*c* connected to the first support member 113*a*. The first support member 113*a* may have a hemispherical shape. However, the first support member is not limited thereto. The first support member 113*a* may have a different shape that allows the headband 120 connected to the second connection member 114 to pivot while supporting the second connection member 114 connected to the first connection member 113. In addition, the second support member 114*c* may include a structure capable of accommodating a hemispherical shape. However, the second support member is not limited thereto. The second support member 114*c* may have a different shape that allows the headband 120 connected to the second connection member 114 to pivot while supporting the first support member 113*a* connected to the first connection member 113. For example, the first support member 113*a* may have a cylindrical shape or a spherical shape. The second support member 114*c* may include a structure capable of accommodating a cylindrical shape or a spherical shape.

According to an embodiment, the second support member 114*c* may have a hemispherical shape. The first support member 113*a* may have a shape accommodating a hemisphere. However, the first support member is not limited thereto. The first support member 113*a* may have a different shape that allows the headband 120 connected to the second connection member 114 to pivot while supporting the second connection member 114 connected to the first connection member 113. In addition, the first support member 113*a* may include a structure capable of accommodating a hemispherical shape. However, the first support member is not limited thereto. The first support member 113*a* may have a different shape that allows the headband 120 connected to the second connection member 114 to pivot while supporting the second support member 114*c* connected to the first connection member 114. For example, the second support member 114*c* may include a cylindrical shape or a spherical shape, and the first support member 113*a* may include a structure capable of accommodating the cylindrical shape or the spherical shape.

According to an embodiment, one surface of the first connection member 113 may form an inclined angle with one surface of the second connection member 114 facing the one surface of the first connection member 113. For example, the one surface of the first connection member 113 may include an inclined surface 113*b*. The inclined surface 113*b* may have configured such that the upper portion thereof is disposed on the front side of the headset 100 with reference to the one surface of the first connection member 113.

Figure 3:
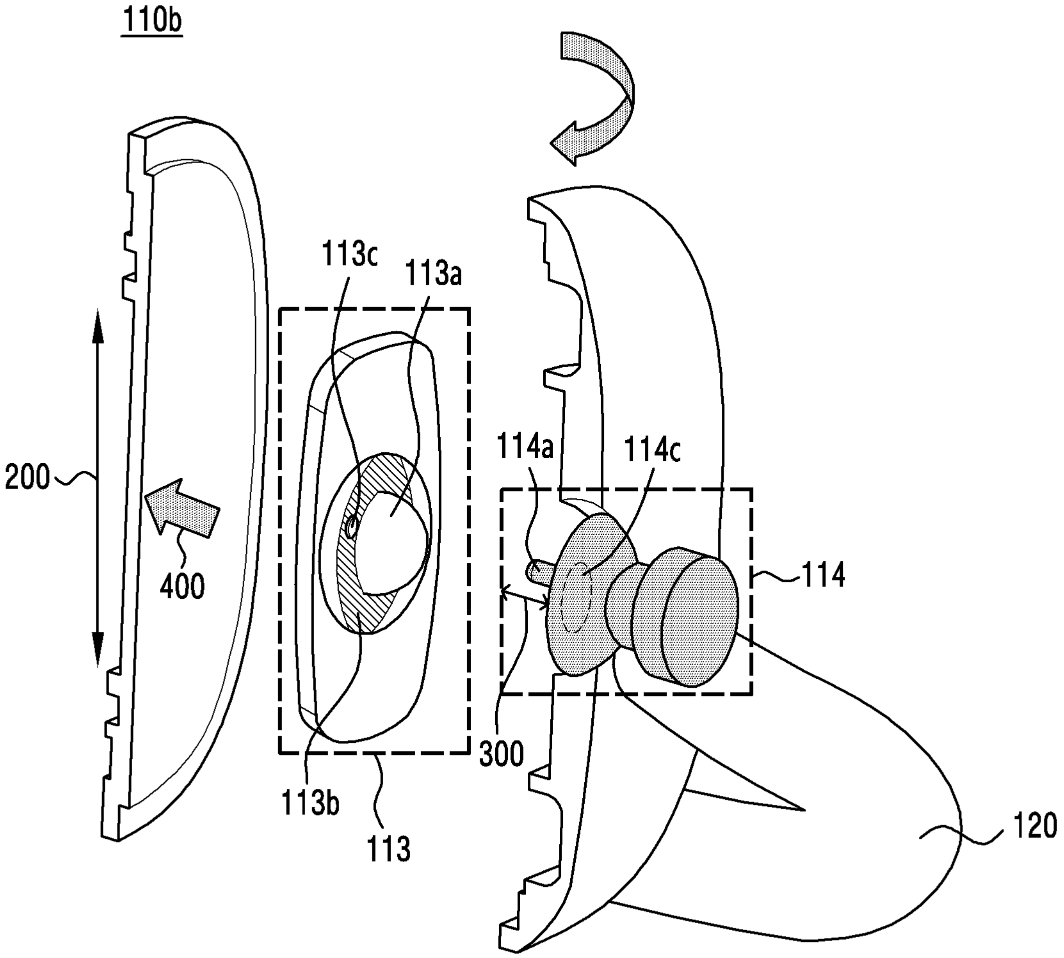
FIG. 3 is a perspective view illustrating a portion of the disassembled ear unit according to an embodiment when used as a neckband type (second state).

FIG. 3 illustrates a configuration of a portion of the ear unit 100*b* when the headset 100 according to various embodiments is used as a neckband type (second state).

According to an embodiment, the second connection member 114 may include a structure configured to apply a pressure to the first connection member 113 in the sound output direction 400 as the headband 120 pivots. For example, the structure configured to apply a pressure to the ear unit 110 in the sound output direction 400 may include a protrusion 114*a* that is rotatable along the inclined surface 113*b*. The protrusion 114*a* may be provided on one surface of the second connection member 114 facing the inclined surface 113*b*. While moving along the inclined surface 113*b*, the protrusion 114*a* may apply a pressure to the first connection member 113 in the longitudinal direction 300 thereof. The pressure applied to the first connection member 113 may be transferred to the front portion of the ear pad 111. The front portion of the ear pad 111 may come into close contact with a user's body surface in the longitudinal direction 300 of the protrusion. As the protrusion 114*a* moves along the inclined surface 113*b*, the intensity of the pressure applied to the first connection member 113 may change. When the protrusion 114*a* moves upward on the inclined surface, the intensity of the pressure applied to the first connection member 113 may increase.

According to an embodiment, the protrusion 114*a* may be provided on one surface of the first connection member 113 surrounding the first support member 113*a*. While moving along the one surface of the second connection member 114 surrounding the second support member 114*c* facing the one surface of the first connection member 113, the protrusion 114*a* may apply a pressure to the first connection member 113 in the longitudinal direction 300 thereof. The pressure applied to the first connection member 113 may be transferred to the front portion of the ear pad 111. The front portion of the ear pad 111 may come into close contact with a user's body surface in the longitudinal direction 300 of the protrusion. As the protrusion 114*a* moves along the inclined surface 113*b*, the intensity of the pressure applied to the first connection member 113 may change. For example, when the protrusion 114*a* moves upward on the inclined surface, the intensity of the pressure applied to the first connection member 113 may increase.

According to an embodiment, the connection member may include a structure accommodating the protrusion 114*a*. At this time, the structure accommodating the protrusion 114*a* may include a recess 113*c*. According to an embodiment, the surface facing the one surface including the protrusion 114*a* may include at least one recess 113*c*. The at least one recess 113*c* may be disposed at a position where at least a portion of the tip of the protrusion 114*a* is capable of being accommodated in the state in which the headband 120 is rotated by a predetermined angle from the longitudinal direction 200 of the ear pad 111. For example, the at least one recess 113*c* may be disposed in the upper portion of the inclined surface 113*b*.

According to an embodiment, the at least one recess 113*c* may be disposed at a position where the at least one recess 113*c* is capable of accommodating at least a portion of the tip of the protrusion 114*a* in a state in which the headband 120 is located in the longitudinal direction 200 of the ear pad 111. When at least a portion of the tip of the protrusion 114*a* is accommodated in the at least one recess 113*c*, the headband 120 may be fixed in the state of being located in the longitudinal direction 200 of the ear pad 111.

According to an embodiment, as the headband 120 pivots, the protrusion 114*a* rotates along the inclined surface 113*b* and may then be accommodated, at a predetermined angle, in the at least one recess 113*c* provided in the inclined surface 113*b*. When the protrusion 114*a* is accommodated in the at least one recess 113*c*, the headband 120 may be fixed in the state of being rotated by a predetermined angle from the longitudinal direction 200 of the ear pad 111.

Figure 4:
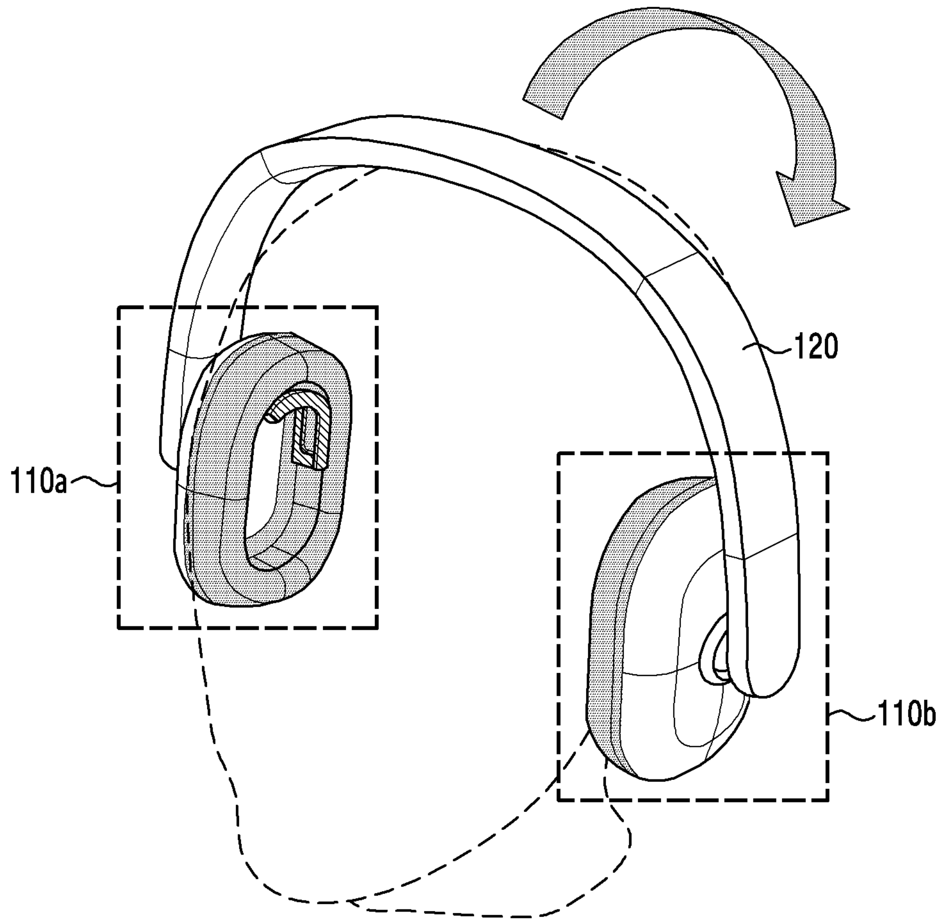
FIG. 4 is a view illustrating a wearing state of the headset according to an embodiment when used as a headband type (first state).

FIG. 4 is a view illustrating a wearing state of the headset 100 when used as a headband type (first state).

Referring to FIG. 4, a user may wear the headset 100 as a headband type (first state) by disposing the headband 120 in the longitudinal direction of the ear pads 111 (200 in FIG. 1). The user may transform the wearing method from a headband type (first state) to a neckband type (second state) or vice versa by pivoting the headband 120.

Figure 5:
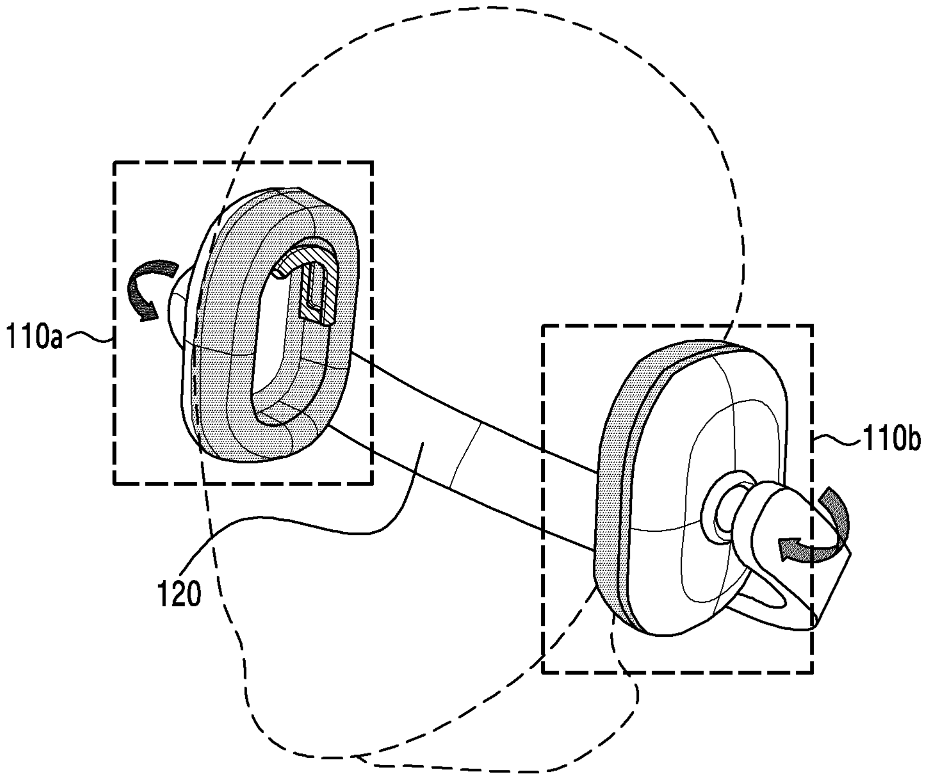
FIG. 5 is a view illustrating a wearing state of the headset according to an embodiment when used as a neckband type (second state).

FIG. 5 is a view illustrating a wearing state of the headset 100 when used as a neckband type (first state).

Referring to FIG. 5, a user may wear the headset 100 as a neckband type (second state) by disposing the headband 120 in a state of being rotated by a predetermined angle from the longitudinal direction (200 in FIG. 1) of the ear pads 111.

According to an embodiment, in the case where the headset 100 is used as the neckband type (second state), when the tip of the protrusion 114*a* is accommodated in the at least one recess 113*c* at a predetermined angle, the headband 120 may be fixed in the state of being rotated by a predetermined angle from the longitudinal direction (200 in FIG. 1) of the ear pads 111.

Figure 6:
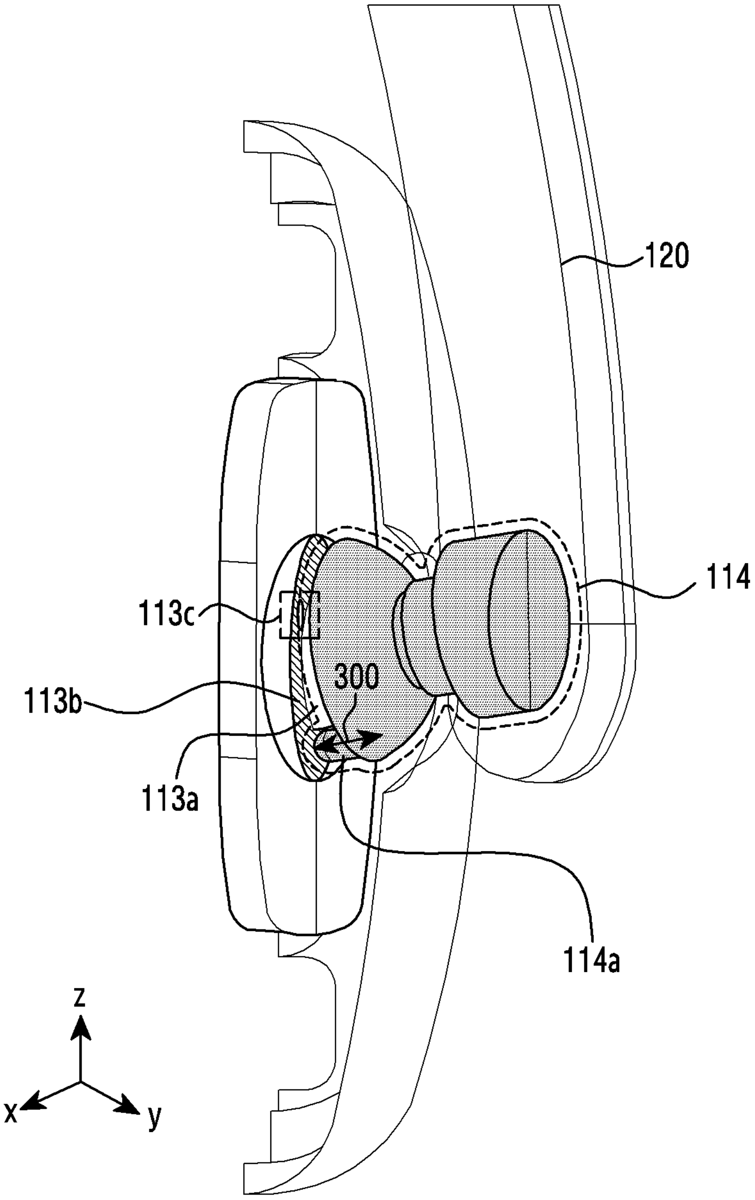
FIG. 6 is a partial cross-sectional view illustrating a connection member according to an embodiment when used as a headband type (first state).

FIG. 6 is a partial cross-sectional view illustrating a connection member of the headset 100 when used in a headband type (first state).

The description of the structure of the second ear unit 110*b* of FIG. 2 may also be applicable to the structure of the connection member of the headset 100 when used in the headband type (first state). The same reference numerals are used for the same or substantially the same components as those described above, and redundant descriptions will be omitted.

According to an embodiment, in the case where the headset 100 is used as the neckband type (second state), when the tip of the protrusion 114*a* is accommodated in the at least one recess 113*c* at a predetermined angle, the headband 120 may be fixed in the state of being rotated by a predetermined angle from the longitudinal direction (200 in FIG. 1) of the ear pads 111. Although only one recess 113*c* is illustrated in FIG. 6, multiple recesses may be provided the inclined surface 113*b* according to an embodiment. The recess 113*c* may be disposed depending on the position of the protrusion 114*a* and the position of the headband 120 in the first state or the position of the headband 120 in the second state.

According to an embodiment, although not illustrated in FIG. 6, the inclined surface 113*b* may further include a recess disposed at a position on the inclined surface 113*b* corresponding to the position of the protrusion 114*a* in the state illustrated in FIG. 6.

Figure 7:
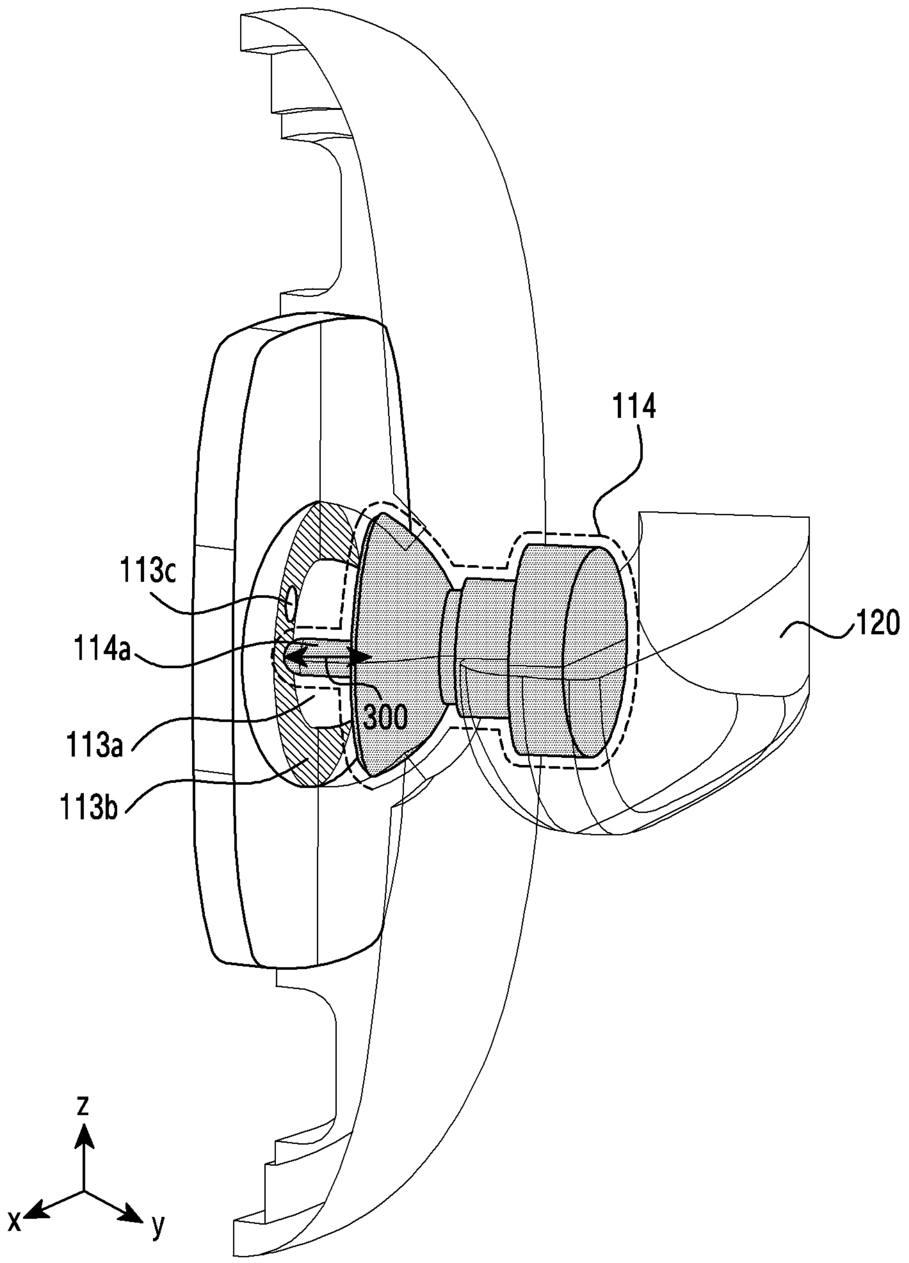
FIG. 7 is a partial cross-sectional view of a connection member illustrating the operating state of FIG. 6.

FIG. 7 is a partial cross-sectional view illustrating a state of a connection member operating from the headband type (first state) of FIG. 6 to the neckband type (second state).

According to an embodiment, as the headband 120 pivots, the protrusion 114*a* rotates along one surface including the recess 113*c*. When the protrusion 114*a* is located in an area having a high height (the upper portion of the inclined surface) in the inclined surface 113*b*, the pressure applied by the protrusion to the inclined surface 113*b* increases. Due to the increase in pressure applied to the inclined surface 113*b*, the front portion of the ear pad 111 may come into close contact with the inner surface of the face in the longitudinal direction 300 of the protrusion. According to an embodiment, the second connection member 114 may further include an elastic body connected to the protrusion 114*a* and may contract or relax when the headband 120 pivots.

According to an embodiment, the elastic body connected to the protrusion 114*a* may contract when the protrusion 114*a* rotates along the inclined surface 113*b* toward the upper portion of the inclined surface 113*b*. The elastic body connected to the protrusion 114*a* may relax when the protrusion 114*a* rotates along the inclined surface 113*b* toward the lower portion of the inclined surface 113*b*. According to an embodiment, the elastic body connected to the protrusion 114*a* may include a spring or rubber.

Figure 8:
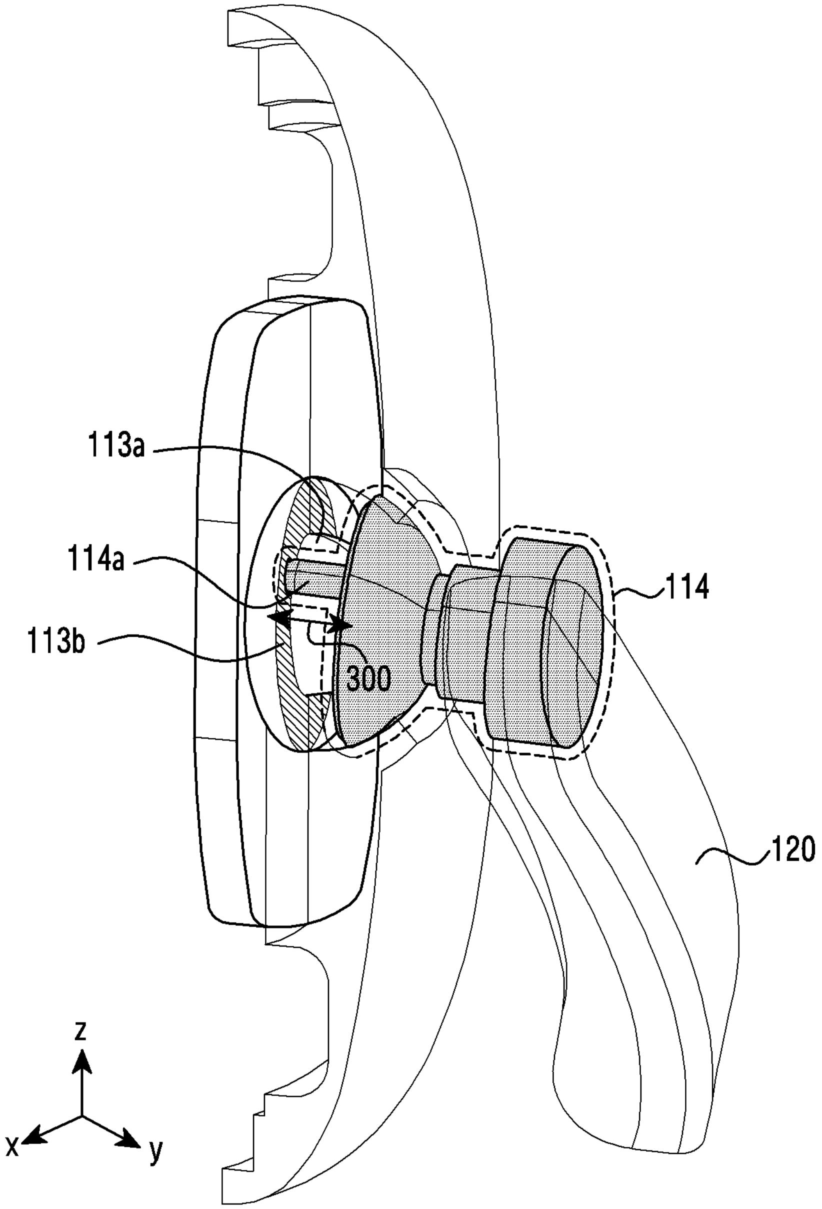
FIG. 8 is a partial cross-sectional view illustrating a connection member according to an embodiment when used as a neckband type (second state).

FIG. 8 is a partial cross-sectional view illustrating the connection member of the headset 100 when used as the neckband type (second state).

The description of the structure of the second ear unit 110*b* of FIG. 3 may also be applicable to the structure of the connection member of the headset 100 when used in the neckband type (second state). The same reference numerals are used for the same or substantially the same components as those described above, and redundant descriptions will be omitted.

In a state in which the projection 114*a* is moved to a position corresponding to the recess 113*a* by the rotation of the headband 120, one end of the protrusion 114*a* may be accommodated in the recess 113*a*. As one end of the protrusion 114*a* is accommodated in the recess 113*a*, the position of the headband 120 may be fixed.

Figure 9:
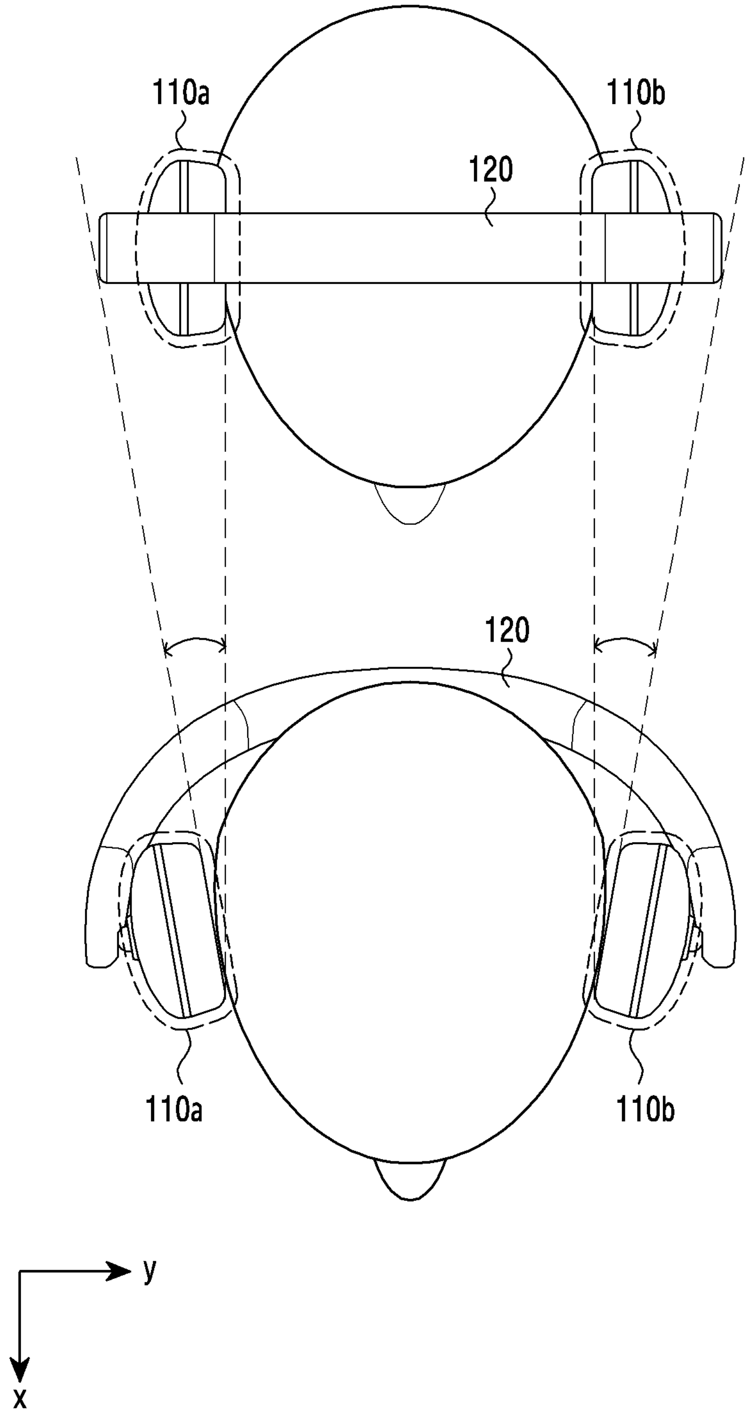
FIG. 9 is a view illustrating wearing states of a headband showing a difference in angle between ear units in a headband type (first state) and ear units in a neckband type (second state) according to an embodiment.

FIG. 9 is a view illustrating wearing states of a headset, showing a difference in angle between each ear unit 110 in the headband type (first state) and each ear unit 110 in the neckband type (second state).

According to an embodiment, the angle formed between one surface of each ear unit 110 that is in contact with a user's body and the x-axis may be greater in the neckband type (second state) than in the headband type (first state). The description made with reference to FIG. 3 may be applicable to the structure in which the angle formed by each ear unit 110 and the x-axis changes as the headband 120 pivots. The same reference numerals are used for the same or substantially the same components as those described above, and redundant descriptions will be omitted.

Figure 10:
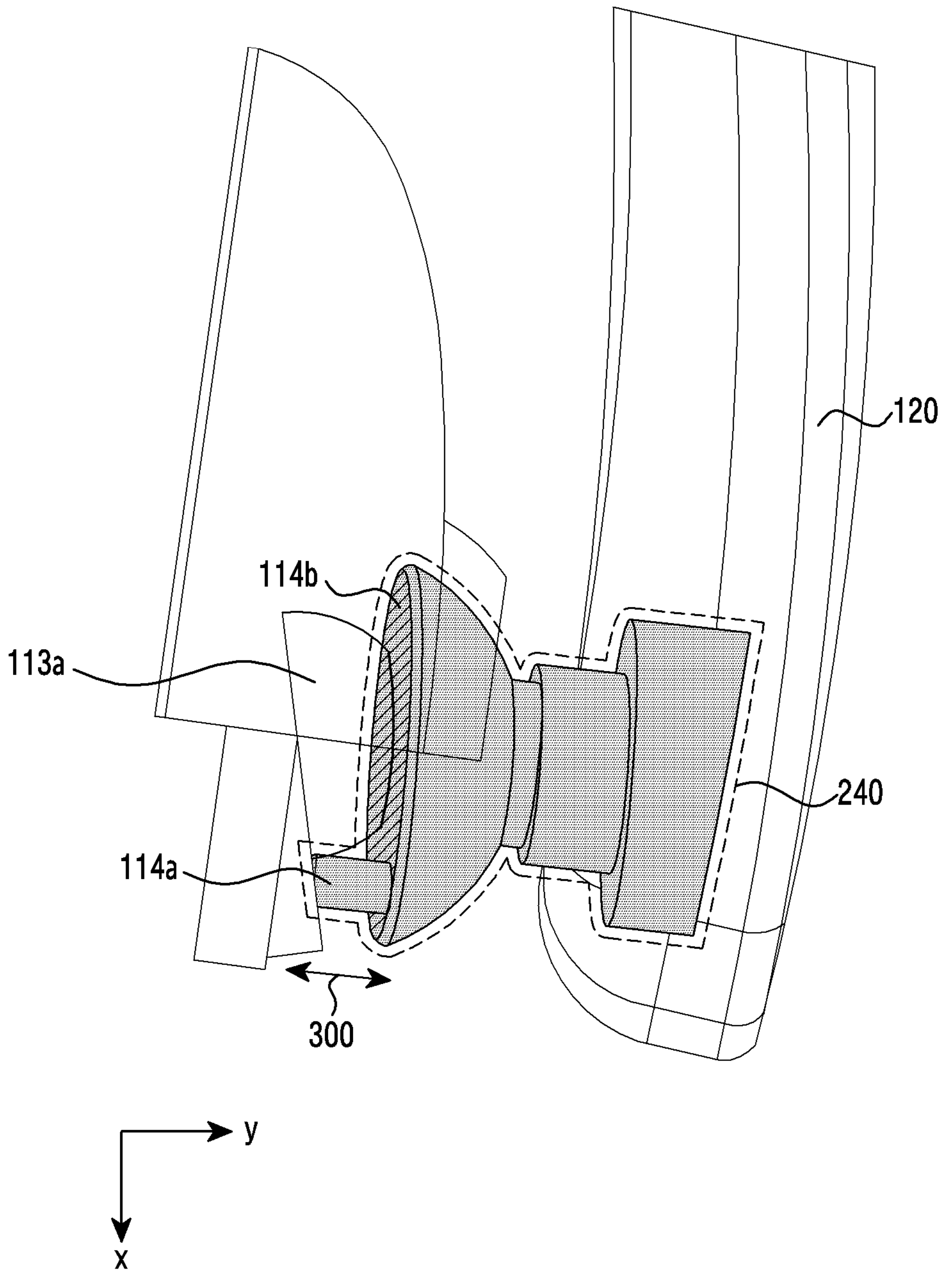
FIG. 10 is a partial cross-sectional view of a connection member including a structure having an inclined surface in a second connection member according to an embodiment.

FIG. 10 is a partial cross-sectional view illustrating a connection member of a headset 100 in which an inclined surface 114*b* is provided on one surface of a second connection member 114 according to an embodiment.

According to an embodiment, the one surface of the second connection member 114 may include an inclined surface 114*b* disposed to form an inclined angle with one surface of the first connection member 113 facing the second connection member 114. The inclined surface 114*b* may be configured such that the upper portion thereof is disposed on the front side of the headset 100 with reference to the one surface of the second connection member 114 in the state in which the headband 120 is rotated by a predetermined angle from the longitudinal direction of the ear pad 111 (200 in FIG. 1).

According to an embodiment, the second connection member 114 may include a structure configured to apply a pressure to the first connection member 113 in the sound output direction 400 as the headband 120 pivots. According to an embodiment, the structure configured to apply a pressure to the ear unit 110 in the sound output direction 400 may be configured in the form of a protrusion 114*a* that is rotatable along the inclined surface 114*b*. The protrusion 114*a* may be provided on one surface of the first connection member 113 facing the inclined surface 114*b*. While moving along the one surface of the first connection member 113 facing the inclined surface 114*b*, the protrusion 114*a* may apply a pressure to the first connection member 113 in the longitudinal direction 300 thereof. The pressure applied to the first connection member 113 may be transferred to the front portion of the ear pad 111. The front portion of the ear pad 111 may come into close contact with a user's body surface in the longitudinal direction 300 of the protrusion. As the protrusion 114*a* moves along the one surface of the first connection member 113 facing the inclined surface 114*b*, the intensity of the pressure applied to the first connection member 113 may change. When the protrusion 114*a* moves toward the front portion of the ear pad 111 with reference to the one surface of the first connection member 113, the intensity of pressure applied to the first connection member 113 may increase.

According to an embodiment, the protrusion 114*a* may be provided on one surface of the first connection member 113 surrounding the first support member 113*a*. While moving along the one surface of the second connection member 114 surrounding the second support member 114*c* facing the one surface of the first connection member 113, the protrusion 114*a* may apply a pressure to the first connection member 113 in the longitudinal direction 300 thereof. The pressure applied to the first connection member 113 may be transferred to the front portion of the ear pad 111. The front portion of the ear pad 111 may come into close contact with a user's body surface in the longitudinal direction 300 of the protrusion. As the protrusion 114*a* moves along the inclined surface 113*b*, the intensity of the pressure applied to the first connection member 113 may change. When the protrusion 114*a* moves toward the front portion of the ear pad 111 with reference to the one surface of the first connection member 113, the intensity of pressure applied to the first connection member 113 may increase.

According to an embodiment, the connection member may include a structure capable of accommodating the protrusion 114*a*. At this time, the structure capable of accommodating the protrusion 114*a* may be implemented in the form of a recess 113*c*. The surface facing the one surface including the protrusion 114*a* may include at least one recess 113*c*. The at least one recess 113*c* may be disposed at a position where at least a portion of the tip of the protrusion 114*a* is capable of being accommodated in the state in which the headband 120 is rotated by a predetermined angle from the longitudinal direction (200 in FIG. 1) of the ear pad 111. According to an embodiment, the at least one recess 113*c* may be disposed in the upper portion of the inclined surface 113*b*.

According to an embodiment, the at least one recess 113*c* may be disposed at a position where the at least one recess 113*c* is capable of accommodating at least a portion of the tip of the protrusion 114*a* in a state in which the headband 120 is located in the longitudinal direction (200 in FIG. 1) of the ear pad 111. When at least a portion of the tip of the protrusion 114*a* is accommodated in the at least one recess 113*c*, the headband 120 may be fixed in the state of being located in the longitudinal direction (200 in FIG. 1) of the ear pad 111.

According to an embodiment, as the headband 120 pivots, the protrusion 114*a* rotates along the inclined surface 113*b* and may then be accommodated, at a predetermined angle, in the at least one recess 113*c* provided in the inclined surface 113*b*. When the protrusion 114*a* is accommodated in the at least one recess 113*c*, the headband 120 may be fixed in the state of being rotated by a predetermined angle from the longitudinal direction (200 in FIG. 1) of the ear pad 111.

Figure 11:
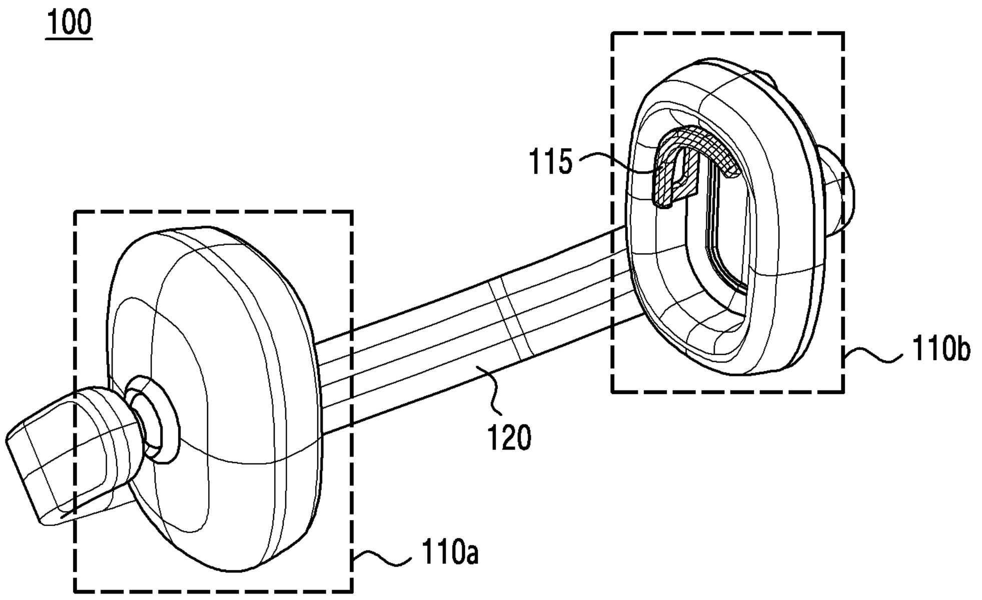
FIG. 11 is a perspective view illustrating a headset in which a holder is added to an ear unit according to an embodiment.

FIG. 11 is a perspective view of a headset 100 including a holder 115 according to an embodiment.

According to an embodiment, a first ear unit 110*a* and a second ear unit 110*b* may each include a structure to fix the headset 100 to a user's body. According to an embodiment, the structure to fix the headset may include a holder 115. According to an embodiment, the holder 115 may include a structure that is insertable into a user's auricle and a connection portion connected to one end of the ear unit 110. The structure that is insertable into a user's auricle may include an earring portion curved in a shape corresponding to the user's ear. According to an embodiment, the length of the tip of the earring portion may extend in a direction toward the front portion or in a direction of gravity. According to an embodiment, the rear end of the connection portion may be connected to the ear unit 110. The ear end of the connection portion may be connected to the ear unit 110. One or more connection portions connected to the ear unit 110 may exist. For example, the connection portions connected to the unit 110 may be provided at opposite ends of the earring portion to define an opening into which a user's ear is insertable. However, the connection portion is not limited to this structure and may have another shape that allows the ear unit 110 to be fixed to a user's body when the headband 120 pivots. For example, the holder 115 may have a shape of a protrusion that is capable of being hooked on the upper end of a user's ear.

Figure 12:
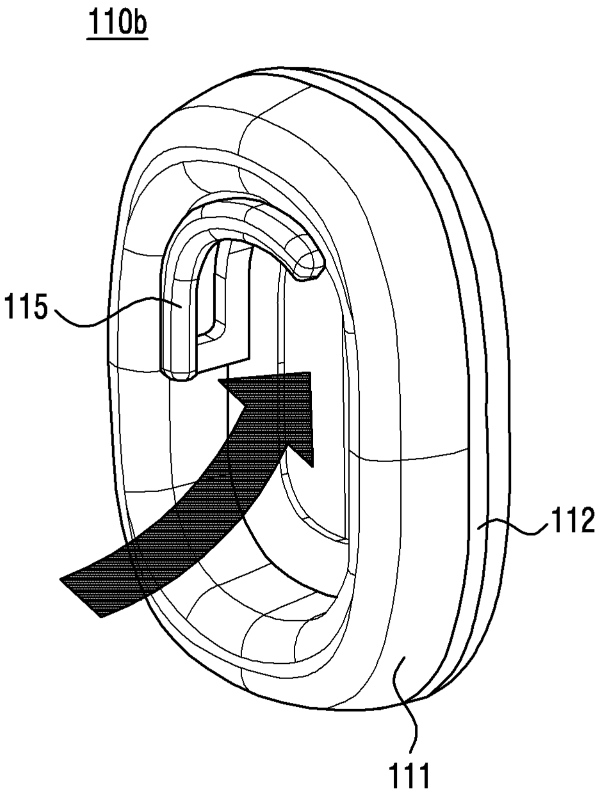
FIG. 12 illustrates wearing of an ear unit to which a holder according to an embodiment is added.

FIG. 12 illustrates a method of wearing a second ear unit 110*b* including the holder 115 according to an embodiment.

According to an embodiment, the holder 115 may include a structure in which a user's auricle is insertable between the holder 115 and the ear unit 110 in the direction of the arrow in FIG. 12. However, the holder is not limited to this structure and may have another shape that allows the ear unit 110 to be fixed to a user's body when the headband 120 pivots. For example, the holder 115 may include a protrusion that is capable of being hooked on the upper end of a user's ear.

According to an embodiment, the holder 115 may be spaced apart from the unit 110 by a predetermined distance. One end of the connection portion of the holder 115 may be pivotally coupled to one end of the ear unit 110 to be spaced apart from the ear unit 110. However, it is not limited to this structure, and according to an embodiment, the connection portion of the holder 115 may include an elastic body to be easily spaced apart from the ear unit 110 by a predetermined distance. The elastic body included in the connection portion of the holder 115 may include a spring or rubber.

Figure 13:
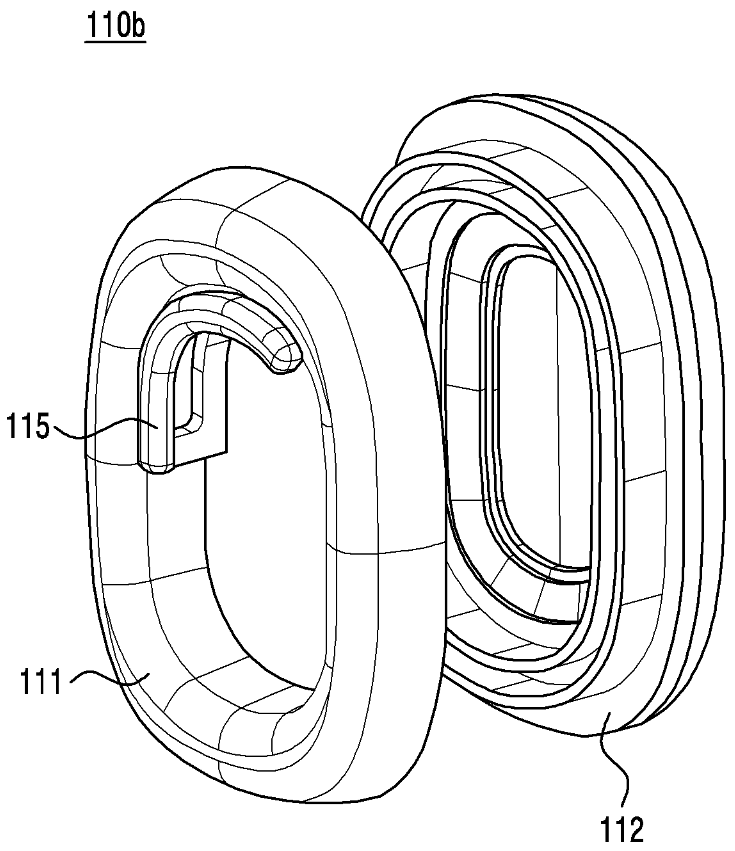
FIG. 13 is a perspective view illustrating an ear unit in which a holder according to an embodiment extends from an ear pad.

FIG. 13 illustrates a structure in which a holder 115 may extend from an ear pad 111 according to an embodiment.

The description made with reference to FIGS. 11 and 12 may be applicable to the structure that allows the holder 115 to be fixed to a user's body. The same reference numerals are used for the same or substantially the same components as those described above, and redundant descriptions will be omitted.

According to an embodiment, the holder 115 may extend from the ear pad 111. The holder 115 may be spaced apart from the ear pad 111 by a predetermined distance. One end of the connection portion of the holder 115 may be pivotally coupled to be spaced apart from the ear pad 111. However, the holder is not limited to this structure. For example, the connection portion of the holder 115 may include an elastic body that allows the ear pad 111 to be spaced apart from the ear pad 111 by a predetermined distance. The elastic body included in the connection portion of the holder 115 may include a spring or rubber.

According to an embodiment, the holder 115 and the ear pad 111 may be processed or fabricated into a single shape. The single shape may be separated from the headset 100 and replaced. According to an embodiment, the holder 115 extending from the ear pad 111 may be fabricated integrally with a component of the ear pad 111 that is connected to the holder 115.

Figure 14:
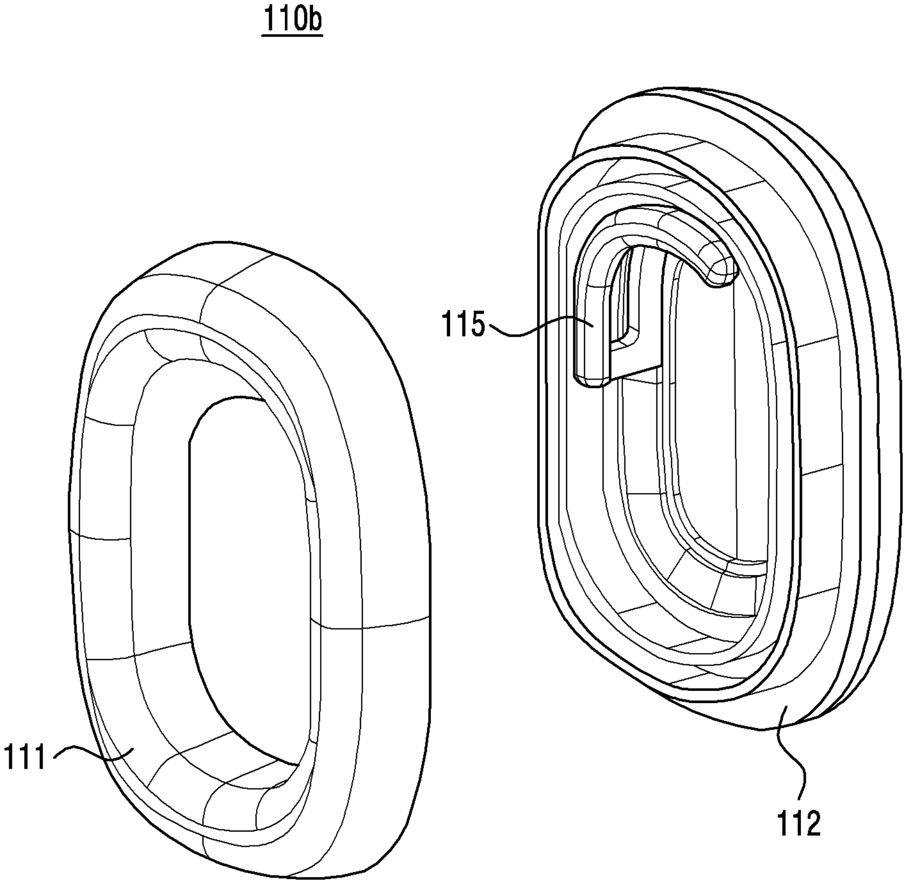
FIG. 14 is a perspective view illustrating an ear unit in which a holder according to an embodiment extends from an earphone body.

FIG. 14 illustrates a structure in which a holder 115 according to an embodiment may extend from an earphone body.

The description made with reference to FIGS. 11 and 12 may be applicable to the structure that allows the holder 115 to be fixed to a user's body. The same reference numerals are used for the same or substantially the same components as those described above, and redundant descriptions will be omitted.

According to an embodiment, the holder 115 may be spaced apart from an earphone body by a predetermined distance. One end of the connection portion of the holder 115 may be pivotally coupled to be spaced apart from the earphone body. However, the connection portion of the holder 15 is not limited to this structure, and according to an embodiment, the connection portion of the holder 115 may include an elastic body to be spaced apart from the earphone body by a predetermined distance. The elastic body included in the connection portion of the holder 115 may include a spring or rubber.

According to an embodiment, the holder 115 and the earphone body may be processed or fabricated into a single shape. The single shape may be separated from the headset 100 and replaced. According to an embodiment, the holder 115 extending from the earphone body may be fabricated integrally with a component of the earphone body connected to the holder 115.

Figure 15:
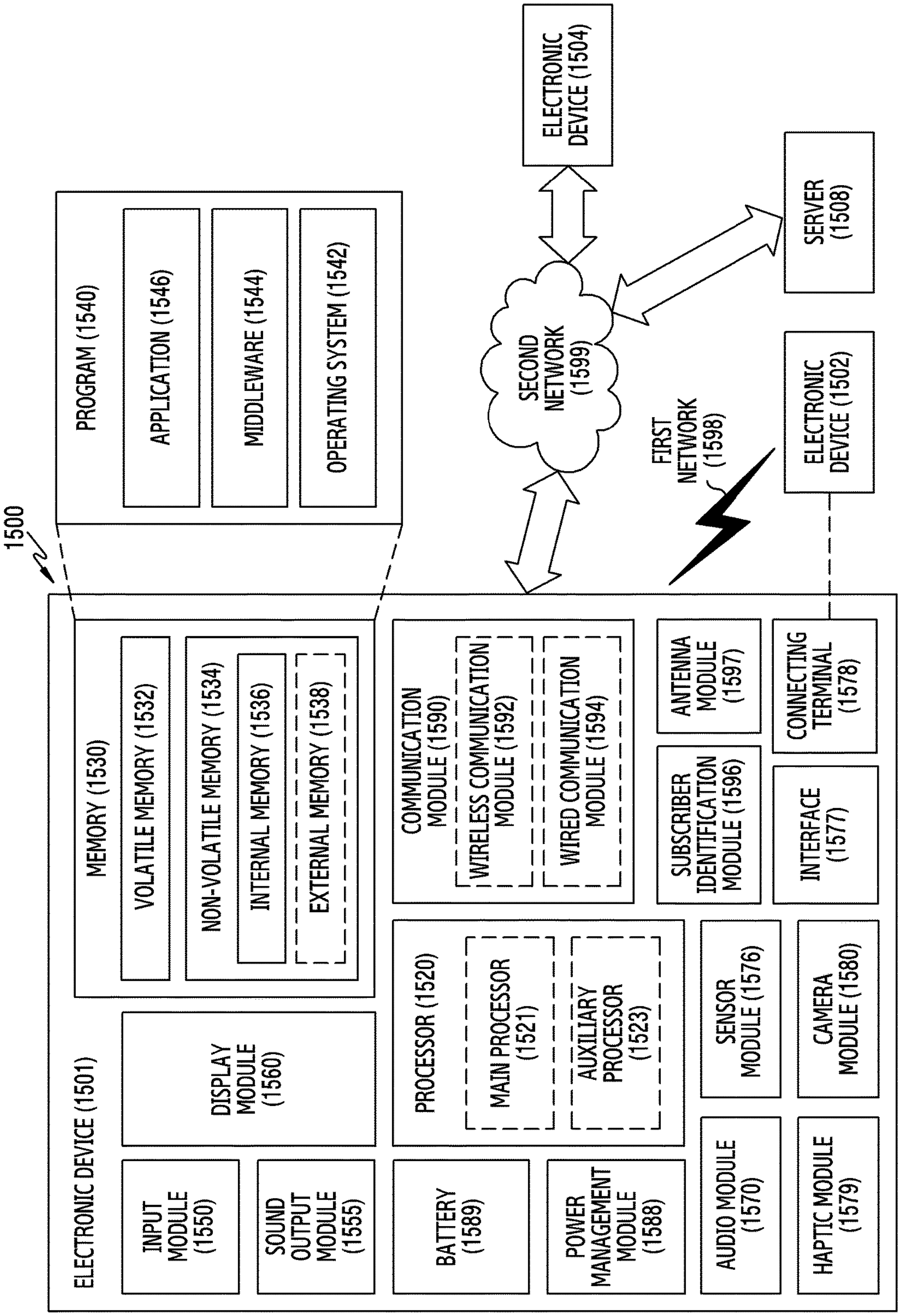
FIG. 15 is a block diagram of an electronic device according to various embodiments in a network environment.

FIG. 15 is a block diagram illustrating an electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be integrated into a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control, for example, at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active (e.g., executing an application) state. According to an embodiment, the auxiliary processor 1523 (e.g., an image signal processor or a communication processor) may be implemented as a part of another component (e.g., the camera module 1580 or the communication module 1590) functionally related to the auxiliary processor 1523. According to an embodiment, the auxiliary processor (e.g., a neural processing unit (NPU)) may include a hardware structure specific to processing of an artificial intelligence model. The artificial model may be generated through machine learning. For example, this learning may be performed by the electronic device 1501 itself where artificial intelligence is executed, and may also be performed through a separate server (e.g., the server 1508). A learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep brief network (DBN), a bidirectional recurrent deep neural network (BRDNN), a deep Q-network, and a combination of two or more thereof, but is not limited to the above examples. Additionally or alternatively, the artificial intelligence model may include a software structure, in addition to the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520)

of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a sensor circuit (e.g., a pressure sensor) adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or an external electronic device (e.g., an electronic device 1502 (e.g., a speaker or a headphone)) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly or wirelessly. According to an embodiment, the interface 1577 may include, for example, a high definition multimedia interface (HDMI), a universal serial bus (USB) interface, a secure digital (SD) card interface, or an audio interface.

The connecting terminal 1578 may include a connector via which the electronic device 1501 may be physically connected with the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support 5G networks and next-generation communication technologies beyond 4G networks, for example, a new radio (NR) access technology. The NR access technology may support enhanced mobile broadband (eMBB), massive machine type communications (mMTC), or ultra-reliable and low-latency communications (URLLC). The wireless communication module 1592 may support high-frequency bands (e.g., the mmWave band), for example, in order to achieve a high data transfer rate. The wireless communication module 1592 may support various technologies for ensuring performance in high-frequency bands, such as beamforming, massive multiple-input and multiple-output (massive MIMO), full dimensional MIMO (FD-MIMO), array antenna, analog beam-forming, or large-scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on or adjacent to a first surface (e.g., the bottom surface) of the printed circuit board and capable of supporting a designated high-frequency band (e.g., the mmWave band), and a plurality of antennas (e.g., an array antenna) disposed on or adjacent to second surface (e.g., the top or side surface) of the printed circuit board and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the external electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultralow-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C” may include all possible combinations of the items enumerated together in a corresponding one of the phrases. As used herein, such terms as “a first”, “a second”, “the first”, and “the second” may be used to simply distinguish a corresponding element from another, and does not limit the elements in other aspect (e.g., importance or order). It is to be understood that if an element (e.g., a first element) is referred to, with or without the term “operatively” or “communicatively”, as “coupled with/to” or “connected with/to” another element (e.g., a second element), it means that the element may be coupled/connected with/to the other element directly (e.g., wiredly), wirelessly, or via a third element.

As used herein, the term “module” may include a unit implemented in hardware, software, or firmware, and may be interchangeably used with other terms, for example, “logic,” “logic block,” “component,” or “circuit”. The “module” may be a minimum unit of a single integrated component adapted to perform one or more functions, or a part thereof. For example, according to an embodiment, the “module” may be implemented in the form of an application-specific integrated circuit (ASIC).

Various embodiments as set forth herein may be implemented as software (e.g., the program 1540) including one or more instructions that are stored in a storage medium (e.g., the internal memory 1536 or external memory 1538) that is readable by a machine (e.g., the electronic device 1501). For example, a processor (e.g., the processor 1520) of the machine (e.g., the electronic device 1501) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

As described above, a headset (e.g., the headset 100 in FIG. 1) according to an embodiment may include an ear unit configured to accommodate a speaker therein, a headband, a first connection member disposed inside the ear unit, and a second connection member coupled to the headband. The first connection member may include a first support member connected to the second connection member such that the headband is pivotable, and an inclined surface provided to surround the support member and disposed to form an inclined angle with a surface of the second connection member facing the inclined surface. An upper portion of the inclined surface may be disposed on the front side of the headset, and the second connection member may include a protrusion disposed on the one surface of the second connection member facing the inclined surface and disposed to rotate along the inclined surface as the headband pivots.

According to an embodiment, the inclined surface may include at least one recess configured to accommodate at least a portion of the tip of the protrusion.

According to an embodiment, the at least one recess may be disposed in the upper portion of the inclined surface.

According to an embodiment, the ear unit may include a first ear unit connected to one end of the headband and a second ear unit connected to the other end of the headband, each of the first ear unit and the second ear unit may include an ear pad defining a space configured to accommodate a user's ear to face another ear unit, and each of the ear units may include a holder disposed in the space defined by the ear pad.

According to an embodiment, each of the ear units may include an earphone body including the first connection member, and the ear pad may be detachably coupled to the earphone body.

According to an embodiment, the holder may extend from the ear pad.

According to an embodiment, the holder may extend from the earphone body.

According to an embodiment, the second connection member may further include an elastic body connected to the protrusion.

According to an embodiment, the at least one recess may include a recess disposed at a position where the at least a portion of the tip of the protrusion is accommodated in a state in which the headband is located in a longitudinal direction of the ear pad.

According to an embodiment, the at least one recess may include a recess disposed at a position where the at least a portion of the tip of the protrusion is accommodated in a state in which the headband is located by a predetermined angle from a longitudinal direction of the ear pad.

According to an embodiment, the second connection member may include a second support member connected to the first connection member such that the headband is pivotable, and an inclined surface provided to surround the second support member and disposed to form an inclined angle with one surface of the first connection member facing the inclined surface. An upper portion of the inclined surface may be disposed on the front side of the headset with reference to the one surface of the first connection member, and the second connection member may include a protrusion disposed on the one surface of the inclined surface and disposed to rotate along the one surface of the first connection member as the headband pivots.

According to an embodiment, the one surface of the first connection member facing the inclined surface may include at least one recess accommodating at least a portion of the tip of the protrusion.

According to an embodiment, the at least one recess may include a recess disposed on the front side of the one surface of the first connection member facing the inclined surface.

According to an embodiment, the ear unit may include a first ear unit connected to one end of the headband, and a second ear unit connected to the other end of the headband. Each of the first ear unit and the second ear unit may include an ear pad defining a space configured to accommodate a user's ear to face another ear unit, and each of the ear units may include a holder disposed in the space defined by the ear pad.

According to an embodiment, each of the ear units may include an earphone body including the first connection member, and the ear pad may be detachably coupled to the earphone body.

As described above, a headset (e.g., the headset 100 in FIG. 1) according to an embodiment may include an ear unit configured to accommodate a speaker therein, a headband, a first connection member disposed inside the ear unit, and a second connection member coupled to the headband. The second connection member may include a second support member connected to the first connection member such that the headband is pivotable, and an inclined surface provided to surround the second support member and disposed to form an inclined angle with a surface of the first connection member facing the inclined surface. An upper portion of the inclined surface may be disposed on the front side of the headset, and the second connection member may include a protrusion disposed on the one surface of the inclined surface and disposed to rotate along the one surface of the first connection member as the headband pivots.

According to an embodiment, the one surface of the first connection member facing the inclined surface may include at least one recess accommodating at least a portion of the tip of the protrusion.

According to an embodiment, the at least one recess may include a recess disposed on the front side of the one surface of the first connection member facing the inclined surface.

According to an embodiment, the ear unit may include a first ear unit connected to one end of the headband and a second ear unit connected to the other end of the headband, each of the first ear unit and the second ear unit may include an ear pad defining a space configured to accommodate a user's ear to face another ear unit, and each of the ear units may include a holder disposed in the space defined by the ear pad.

According to an embodiment, each of the ear units may include an earphone body including the first connection member, and the ear pad may be detachably coupled to the earphone body.

According to an embodiment, the holder may extend from the ear pad.

According to an embodiment, the holder may extend from the earphone body.

According to an embodiment, the connection member may further include an elastic body connected to the protrusion.

According to an embodiment, the at least one recess may include a recess disposed at a position where the at least a portion of the tip of the protrusion is accommodated in a state in which the headband is located in a longitudinal direction of the ear pad.

According to an embodiment, the at least one recess may include a recess disposed at a position where the at least a portion of the tip of the protrusion is accommodated in a state in which the headband is located by a predetermined angle from a longitudinal direction of the ear pad.

The invention claimed is:

1. A headset comprising:

an ear unit configured to accommodate a speaker therein;

a headband;

a first connection member disposed inside the ear unit; and a second connection member coupled to the headband, wherein the first connection member comprises:

a first support member connected to the second connection member such that the headband is pivotable; and an inclined surface provided to surround the first support member and disposed to form an inclined angle with a surface of the second connection member facing the inclined surface, wherein an uppermost portion of an incline of the inclined surface is disposed at a front portion of the headset, wherein the front portion of the headset when worn on an ear of the user corresponds to a front of the user's body, wherein the second connection member comprises a protrusion disposed on the surface of the second connection member facing the inclined surface and disposed to rotate along the inclined surface as the headband pivots, and wherein a distance between the inclined surface and the surface of the second connection member is configured to change at the front portion of the headset as the protrusion rotates along the inclined surface.

2. The headset of claim 1, wherein the inclined surface comprises at least one recess configured to accommodate at least a portion of a tip of the protrusion.

3. The headset of claim 2, wherein the at least one recess is disposed in the upper portion of the inclined surface.

4. The headset of claim 2, wherein:

the ear unit comprises a first ear unit connected to one end of the headband and a second ear unit connected to an opposite end of the headband, each of the first ear unit and the second ear unit comprises an ear pad defining a space configured to accommodate the user's ear to face another ear unit, and the at least one recess comprises a recess disposed at a position where the at least a portion of the tip of the protrusion is accommodated in a state in which the headband is located in a longitudinal direction of the respective ear pad.

5. The headset of claim 2, wherein:

the ear unit comprises a first ear unit connected to one end of the headband and a second ear unit connected to an opposite end of the headband, each of the first ear unit and the second ear unit comprises an ear pad defining a space configured to accommodate the user's ear to face another ear unit, and the at least one recess comprises a recess disposed at a position where the at least a portion of the tip of the protrusion is accommodated in a state in which the headband is located by a predetermined angle from a longitudinal direction of the respective ear pad.

6. The headset of claim 1, wherein the ear unit comprises a first ear unit connected to one end of the headband and a second ear unit connected to an opposite end of the headband, each of the first ear unit and the second ear unit comprises an ear pad defining a space configured to accommodate the user's ear to face another ear unit, and each of the ear units comprises a holder disposed in the space defined by the respective ear pad.

7. The headset of claim 6, wherein each of the ear units comprises an earphone body comprising the first connection member, and the respective ear pad is detachably coupled to the respective earphone body.

8. The headset of claim 7, wherein the respective holder extends from the respective ear pad.

9. The headset of claim 7, wherein the respective holder extends from the respective earphone body.

10. The headset of claim 1, wherein the second connection member further comprises an elastic body connected to the protrusion.

11. A headset comprising:

an ear unit configured to accommodate a speaker therein;

a headband;

a first connection member disposed inside the ear unit; and a second connection member coupled to the headband, wherein the second connection member comprises:

a second support member connected to the first connection member such that the headband is pivotable; and an inclined surface provided to surround the second support member and disposed to form an inclined angle with a surface of the first connection member facing the inclined surface, wherein an uppermost portion of an incline of the inclined surface is disposed at a front portion of the headset, wherein the front portion of the headset when worn on an ear of the user corresponds to a front of the user's body, wherein the second connection member comprises a protrusion disposed on the inclined surface and disposed to rotate along the surface of the first connection member as the headband pivots, and wherein a distance between the inclined surface and the surface of the first connection member is configured to change at the front portion of the headset as the protrusion rotates along the surface of the first connection member.

12. The headset of claim 11, wherein the surface of the first connection member facing the inclined surface comprises at least one recess accommodating at least a portion of a tip of the protrusion.

13. The headset of claim 12, wherein the at least one recess is disposed on the front side of the surface of the first connection member facing the inclined surface.

14. The headset of claim 11, wherein the ear unit comprises a first ear unit connected to one end of the headband and a second ear unit connected to an opposite end of the headband, each of the first ear unit and the second ear unit comprises an ear pad defining a space configured to accommodate the user's ear to face another ear unit, and each of the ear units comprises a holder disposed in the space defined by the respective ear pad.

15. The headset of claim 14, wherein each of the ear units comprises an earphone body comprising the first connection member, and the respective ear pad is detachably coupled to the respective earphone body.

16. A headset comprising:

a headband;

ear units at respective ends of the headband, each ear unit accommodating a speaker therein and comprising a first connection member; and second connection members coupled to the respective ends of the headband at the ear units, wherein:

the respective first connection member comprises:

a first support member connected to a corresponding one of the second connection members to form a connection about which the headband is pivotable; and an inclined surface provided about the first support member to form an inclined angle with a surface of the corresponding one of the second connection members facing the inclined surface, an uppermost portion of an incline of the inclined surface is disposed at a front portion of the headset, the corresponding one of the second connection members comprises a protrusion disposed on the surface facing the inclined surface for rotation along the inclined surface as the headband pivots, and wherein the front portion of the headset when worn on an ear of the user corresponds to a front of the user's body, wherein a distance between the inclined surface and the surface of the corresponding one of the second connection members is configured to change at the front portion of the headset as the protrusion rotates along the inclined surface.

17. The headset of claim 16, wherein the inclined surface comprises a recess for accommodating a tip of the protrusion.

18. The headset of claim 16, wherein each of the ear units comprises:

an ear pad defining a space configured to accommodate the user's ear; and a holder disposed in the space defined by the respective ear pad.

19. The headset of claim 18, wherein each of the ear units comprises an earphone body comprising the respective first connection member, and the respective ear pad is detachably coupled to the respective earphone body.

20. The headset of claim 19, wherein the respective holder extends from at least one of the respective ear pad and the respective earphone body.

* * * * *